Patented July 25, 1950

2,516,128

UNITED STATES PATENT OFFICE 2,516,128

TREATING CASTOR PRESS CAKE

Eliane Le Breton and Paul Gregory, Paris, France, assignors to "Societe Organico," Paris, France, a corporation of the French Republic No Drawing. Application September 24, 1948, Serial No. 51,120. In France October 1, 1947

1 Claim. (Cl. 195—2)

In our pending application 766,084, Patent No. 2,509,511 filed Aug. 14, 1947, we have described a process of treating certain products containing proteins, which if alone, would be edible, and which products also contain a poisonous protein, by converting the poisonous and non-poisonous proteins into non-toxic amino acids. The said application concerns more particularly the treatment of the press cake made from castor oil beans. Said process involves a treatment of hydrolysis, preferably by means of an acid.

In continuing our researches we have now found that excellent results can be obtained by the treatment of such press cakes by heterolysis. This presents advantageous results over those produced by the treatments described in Ser. No. 766,084, Patent No. 2,509,511 in that acid hydrolysis has the undesired action that it may destroy certain indispensable amino acids, e. g. tryptophane.

Consequently, the process of the present application has for an object, an improved method of application of the principles of the prior application, which includes the destruction of the molecular bonds which produce the toxicity, by heterolysis, in employing certain proteolytic enzymes of animal or vegetable origin, in the digestion of the press cake (especially castor oil bean press cake, or so-called "castor pomace"), in order to degrade the constituent proteids to the state of soluble peptones, polypeptides and free amino acids.

Preferably there is used, as the enzyme capable of giving the best results, one of the following:

(a) Papain, of which the attack will be followed by an action by proteolytic enzymes (ferments) of yeast or analogous mono-cellular organisms having no pathogenic action and selected for their high proportion of enzymes of this kind.

(b) Pepsin and then trypsin, their action being followed by that of the ferments of yeast.

As examples, for illustration of the invention and to make the operation of the invention easily understood (to the details of which the invention is not limited), we give the following.

*Example 1.—Papain and endocellular enzymes of yeast or of azotobacter*

The press cake of castor oil bean in comminuted form, is added to twice its volume of water containing papain. The quantity of the latter depends on its activity. Using a good commercial grade of crude papain, 2% based on the weight of the press cake, will be a satisfactory amount. The pH is about 7. The mass is brought to 70° C., under constant stirring. Hold at this temperature for 4 to 6 hours, with occasional stirring. Then cool to 40° C. Then add autolyzed yeast (brewer's or distiller's yeast) or autolyzed azotobacter culture or any other autolyzed appropriate monocellular culture. The autolzate is prepared in the conventional way, including letting the yeast or analogous culture stand at 37 to 45° C. until a good liquefaction, by autolysis, is secured. The proteolytic enzymes are freed and pass into the autolyzate (6 to 24 hours according to whether a plasmolysis is made at the beginning). To the pulp of press cake and water, after the action of the papain, a quantity of the autolyzate is added, enough to render at least 75% of the nitrogenous material in the cake soluble, in 48 hours, at 40° C. The quantity of distiller's yeast may be 1 to 3 kgs. of pressed yeast per 1 kilog. of the press cake.

After 48 hours of the heterolysis by the ferments of the autolyzed yeast, the mass is centrifuged and there is obtained a juice containing a mixture of the degradation products of the proteins of the yeast and of the castor bean press cake.

After the action of the yeast autolysate on the castor bean cake one gets an heterogeneous mixture made up of a juice holding the amino acids in solution, polypeptids, peptones coming from the enzymatic attack of the proteins to be found in the yeast and cake and holding in suspension the unattacked parts of the monocellular organism (yeast), cellulosic and the like and likely the undigested constituents of the cake.

In order to eliminate those substances in suspension one has to centrifugate or squeeze. The obtained clear nitrogenous juice is concentrated at low temperature (50 to 60° cent. max.) in vacuum by making use of an apparatus of the Restnaer type for example, until getting the desired consistency which latter will depend upon the nature of the product being produced. One can thus prepare:

(1) Liquid broths.
(2) Noodles for broths of the "Marmite" (English) Liebig type.
(3) Mixture made of diet flours with the concentrate, in order to increase the amount of nitrogen. These mixtures can be used either for human or animal nourishment.

Under those conditions one may be satisfied by mixing the concentrated liquid with flour and drying the paste so obtained on convenient machines (machines with scraping blades for instance).

Example 2

Sometimes it may not be easy to obtain good quality papain. Digestive enzymes of animal source can be substituted, e. g. pepsin and trypsin. Better results are obtained by submitting the comminuted press cake added to a volume of water just sufficient to give a flowable liquid pulp or pap, instead of a paste. This mass is first subjected to the action of pepsin, then to the action of trypsin. The solubilization is then, as in the previous example, achieved by the action of autolyzate of yeast. One can proceed thus:

A. Action of pepsin. Freshly obtained stomach mucus or commercial prepared pepsin can be used. The suspension or 1 kg. of pulp of the comminuted press cake with 1.5 to 3 litres of water, is brought to a pH of between 1.5 and 3 by adding hydrochloric acid.

Then a quantity of pepsin is added which in 24 hours gives a maximum attack on the castor cake (attack measured by the aminated groups or carboxyl groups set free). Using a good grade of commercial pepsin, 1 to 2% of this, based on the air-dry weight of the press cake, is sufficient. It is left to act for 24 hours at about 40° C.

B. Then the pH of the mass is brought to about 7.5 by adding (e. g.) NaOH or $Na_2CO_3$.

Then commercial pancreatin equal to 1 to 2% of the weight of the press cake, is added. This will give a maximum attack on the proteids in 24 hours at 40° C. Fresh pancreas of animals, mixed with water, in an equivalent amount, could be substituted. After standing for 24 hours at about 40° C. the mass is neutralized, to pH 7.

C. Then is added, as in Example 1, the autolyzed yeast or autolyzed azotobacter culture, and left to stand for 48 hours, at about 40° C. Then complete the process as in the first example.

In all the operations, agitation favors the action of the enzymes.

The preparations of yeast autolysate are made either following a classic method by warming, during 24 to 36 hours at a temperature of 37 to 40° C. in presence of antiseptic product, either by an hydrolysis realised by the means of enzymes only of cathepsine type by warming, during 18 to 24 hours at 60 to 65° without adding any antiseptic, either by plasmolysis (by the breaking of the cellules which allows a rapid coming out of the enzymes from the cells in which they originally existed) and consequently as in the case of the autolysis, a subsequent action of those enzymes on the proteins of the cake.

This plasmolysis may be obtained by congelation, then rapid rewarming of the yeast suspension added prior to adding certain esters, which are later eliminated during concentrating of the nitrogenous juice.

We claim:

In the treatment of the press cake of castor oil bean which normally contains a poisonous body, the herein described process which comprises acting on a pulp of said castor oil bean press cake with proteolytic enzymes until at least a major portion of the poisonous body has been rendered non-toxic, and thereafter treating the product of such treatment with an agent selected from the group consisting of autolyzed yeast and autolyzed azotobacter.

ELIANE LE BRETON.
PAUL GREGORY.

REFERENCES CITED

The following references are of record in the file of this patent:

UNITED STATES PATENTS

| Number | Name | Date |
|---|---|---|
| 2,297,434 | Rudolph | Sept. 29, 1942 |
| 2,297,503 | Rudolph | Sept. 29, 1942 |